(12) United States Patent
Chang et al.

(10) Patent No.: US 10,174,627 B2
(45) Date of Patent: Jan. 8, 2019

(54) GAS TURBINE ENGINE THIN WALL COMPOSITE VANE AIRFOIL

(71) Applicant: United Technologies Corporation, Hartford, CT (US)

(72) Inventors: Hoyt Y. Chang, Manchester, CT (US); Shelton O. Duelm, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 412 days.

(21) Appl. No.: 14/767,512

(22) PCT Filed: Feb. 5, 2014

(86) PCT No.: PCT/US2014/014908
§ 371 (c)(1),
(2) Date: Aug. 12, 2015

(87) PCT Pub. No.: WO2014/133721
PCT Pub. Date: Sep. 4, 2014

(65) Prior Publication Data
US 2016/0003072 A1    Jan. 7, 2016

Related U.S. Application Data

(60) Provisional application No. 61/769,966, filed on Feb. 27, 2013.

(51) Int. Cl.
*F01D 9/04* (2006.01)
*F01D 5/28* (2006.01)

(52) U.S. Cl.
CPC ............ *F01D 9/041* (2013.01); *F01D 5/282* (2013.01); *F01D 5/284* (2013.01);
(Continued)

(58) Field of Classification Search
CPC .. F01D 9/041; F05D 2220/32; F05D 2230/23; F05D 2230/60; F05D 2240/12; F05D 2300/44; F05D 2300/2261
See application file for complete search history.

(56) References Cited

U.S. PATENT DOCUMENTS 3,731,360 A * 5/1973 Stone, Jr. ............... B23P 15/04
                                              29/889.71
5,141,400 A * 8/1992 Murphy .................. B29C 43/18
                                              416/204 A
(Continued)

FOREIGN PATENT DOCUMENTS

EP    2006487     12/2008
EP    2 500 548    9/2012
(Continued)

OTHER PUBLICATIONS

International Search Report and Written Opinion for PCT/US2014/014908 completed Aug. 12, 2014.
(Continued)

*Primary Examiner* — Mark Laurenzi
*Assistant Examiner* — Shafiq Mian
(74) *Attorney, Agent, or Firm* — Carlson, Gaskey & Olds, P.C.

(57) ABSTRACT

An airfoil for a gas turbine engine has a first layer forming a cavity having transitioning from a first thickness to a second thickness through a ply drop region. A second layer is secured to the first layer.

17 Claims, 3 Drawing Sheets

(52) U.S. Cl.
CPC ...... *F05D 2220/32* (2013.01); *F05D 2230/23* (2013.01); *F05D 2230/60* (2013.01); *F05D 2240/12* (2013.01); *F05D 2300/2261* (2013.01); *F05D 2300/44* (2013.01); *F05D 2300/6033* (2013.01); *Y02T 50/672* (2013.01); *Y02T 50/673* (2013.01)

(56) References Cited

U.S. PATENT DOCUMENTS

| | | | | |
|---|---|---|---|---|
| 5,419,039 | A * | 5/1995 | Auxier | B23P 15/04 29/889.7 |
| 6,318,963 | B1 * | 11/2001 | Emery | F01D 5/186 416/96 A |
| 6,398,501 | B1 * | 6/2002 | Darkins, Jr. | F01D 5/147 416/226 |
| 6,451,416 | B1 * | 9/2002 | Holowczak | B32B 18/00 264/125 |
| 6,709,230 | B2 | 3/2004 | Morrison et al. | |
| 7,066,717 | B2 * | 6/2006 | Morrison | F01D 5/187 29/889.71 |
| 7,258,530 | B2 | 8/2007 | Morrison et al. | |
| 7,435,058 | B2 * | 10/2008 | Campbell | F01D 5/14 416/232 |
| 7,507,466 | B2 | 3/2009 | Steibel et al. | |
| 7,510,379 | B2 | 3/2009 | Marusko et al. | |
| 7,600,979 | B2 | 10/2009 | Steibel et al. | |
| 7,887,300 | B2 * | 2/2011 | Mazzola | F01D 5/147 416/224 |
| 8,137,611 | B2 | 3/2012 | Merrill et al. | |
| 8,596,959 | B2 * | 12/2013 | Durocher | F01D 9/065 415/110 |
| 9,863,254 | B2 * | 1/2018 | Ceglio | F01D 5/186 |
| 2002/0155269 | A1 | 10/2002 | Holowcak et al. | |
| 2008/0124512 | A1 * | 5/2008 | Steibel | C04B 35/573 428/105 |
| 2009/0014926 | A1 | 1/2009 | Marini | |
| 2009/0165924 | A1 * | 7/2009 | Steibel | F01D 5/147 156/89.11 |
| 2011/0085895 | A1 | 4/2011 | Durocher et al. | |
| 2011/0143082 | A1 | 6/2011 | Fritz et al. | |
| 2012/0055609 | A1 | 3/2012 | Blanchard et al. | |
| 2013/0209230 | A1 * | 8/2013 | Batt | F01D 5/181 415/115 |
| 2015/0152734 | A1 * | 6/2015 | Ceglio | F01D 5/186 416/97 R |

FOREIGN PATENT DOCUMENTS

| | | |
|---|---|---|
| EP | 2500548 | 9/2012 |
| WO | 2009117232 | 9/2009 |

OTHER PUBLICATIONS

Extended European Search Report for European Application No. 14757224.2 dated Nov. 23, 2016.

International Preliminary Report on Patentability for PCT Application No. PCT/US2014/014908, dated Sep. 11, 2015.

* cited by examiner

GAS TURBINE ENGINE THIN WALL COMPOSITE VANE AIRFOIL

BACKGROUND

This disclosure relates to a gas turbine engine, and more particularly to composite vane airfoil structure.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

A mid turbine frame is provided between the high and low pressure turbine sections. One type of turbine frame is constructed from a composite material, which is difficult to manufacture. It is desirable to have a small trailing edge radius for aerodynamic performance but as a result, a continuous layer of plies cannot be used at the trailing edge. Instead, the plies terminate at ends that are joined at the trailing edge.

Typically, components are passed through some of the mid turbine frame airfoils. There is a significant differential pressure from the interior of the mid turbine frame to its exterior. As a result of the differential pressure across the airfoil wall, the trailing edge, in particular around the suction side, will tend to bulge open and split the trailing edge.

SUMMARY

In one exemplary embodiment, an airfoil for a gas turbine engine has a first layer forming a cavity having transitioning from a first thickness to a second thickness through a ply drop region. A second layer is secured to the first layer.

In another exemplary embodiment according to the previous embodiments, a space is arranged between the first and second layers, and a filler is provided in the space.

In another exemplary embodiment according to any of the previous embodiments, the second layer terminates in ends forming a V-shape at a trailing edge of the airfoil. The filler is provided between the first layer and second layer.

In another exemplary embodiment according to any of the previous embodiments, the second thickness is provided at a location between the first thickness and the filler.

In another exemplary embodiment according to any of the previous embodiments, the filler is provided near a leading edge of the airfoil.

In another exemplary embodiment according to any of the previous embodiments, each layer includes multiple plies.

In another exemplary embodiment according to any of the previous embodiments, the plies are constructed from a ceramic matrix composite bonded to one another by a resin.

In another exemplary embodiment according to any of the previous embodiments, the ceramic matrix composite is a silicon carbide material.

In another exemplary embodiment according to any of the previous embodiments, the airfoil is a vane.

In another exemplary embodiment according to any of the previous embodiments, the vane is a mid turbine frame vane.

In another exemplary embodiment according to any of the previous embodiments, the airfoil includes a component that passes through the cavity of the vane. The component is adjacent to the first thickness.

In another exemplary embodiment according to any of the previous embodiments, a single cavity is provided in the airfoil.

In another exemplary embodiment, a method of forming an airfoil includes
wrapping a first layer about a mandrel and building a thickened area with the first layer relative to an adjacent area of the first layer, applying a filler over the thickened area, and
wrapping a second layer around the first layer and the filler.

In another exemplary embodiment according to any of the previous embodiments, the method includes the step of placing the layers and the filler as an assembly in a mold.

In another exemplary embodiment according to any of the previous embodiments, the method includes the step of removing the mandrel from the assembly to provide a cavity.

In another exemplary embodiment according to any of the previous embodiments, the second layer is arranged in V-shape to provide the trailing edge.

In another exemplary embodiment according to any of the previous embodiments, each layer includes multiple plies.

In another exemplary embodiment according to any of the previous embodiments, the plies are constructed from a ceramic matrix composite bonded to one another by a resin.

In another exemplary embodiment according to any of the previous embodiments, the ceramic matrix composite is a silicon carbide material.

BRIEF DESCRIPTION OF THE DRAWINGS

The disclosure can be further understood by reference to the following detailed description when considered in connection with the accompanying drawings wherein.

DETAILED DESCRIPTION

Figure 1:
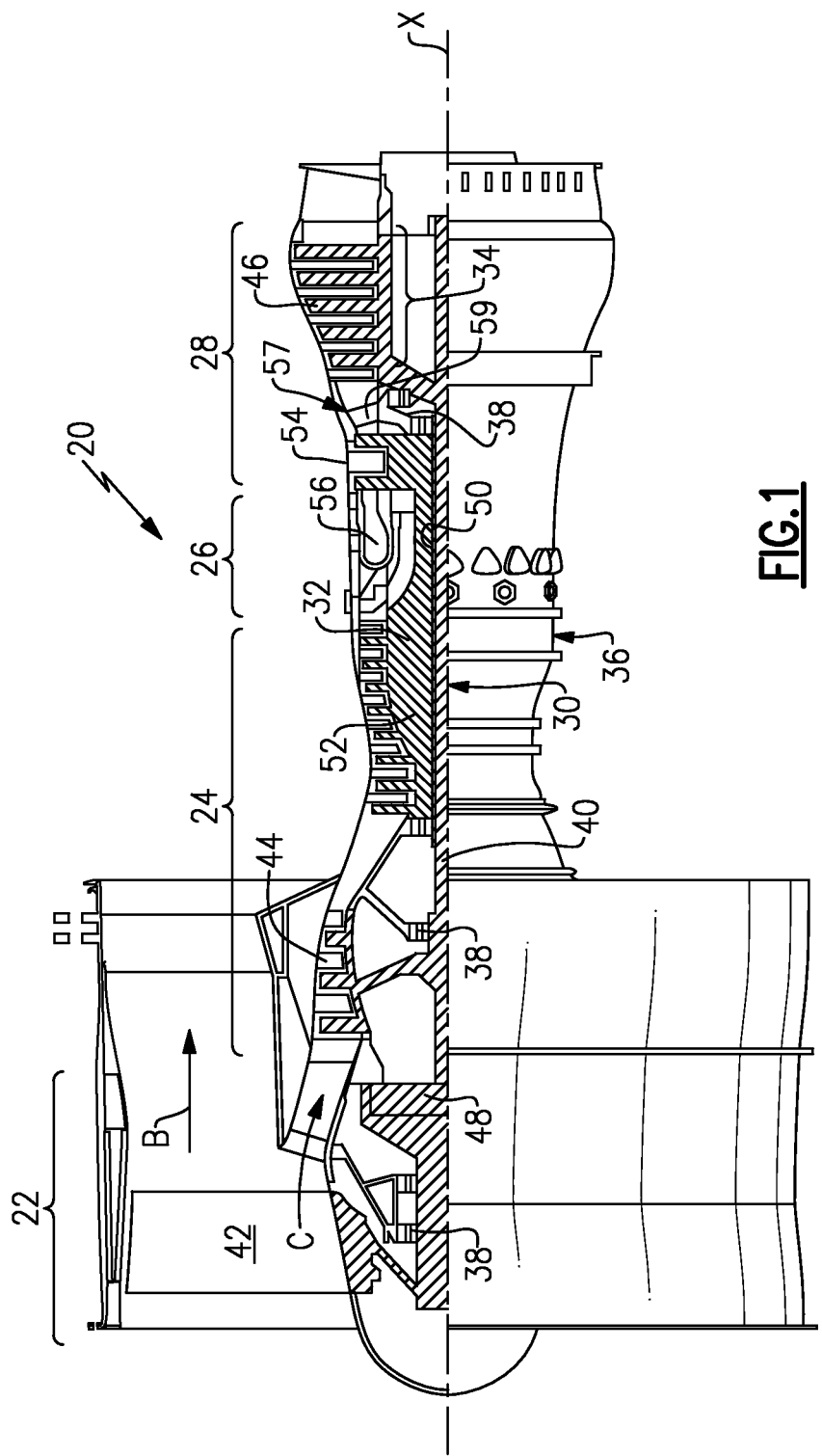
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

Figure 2:
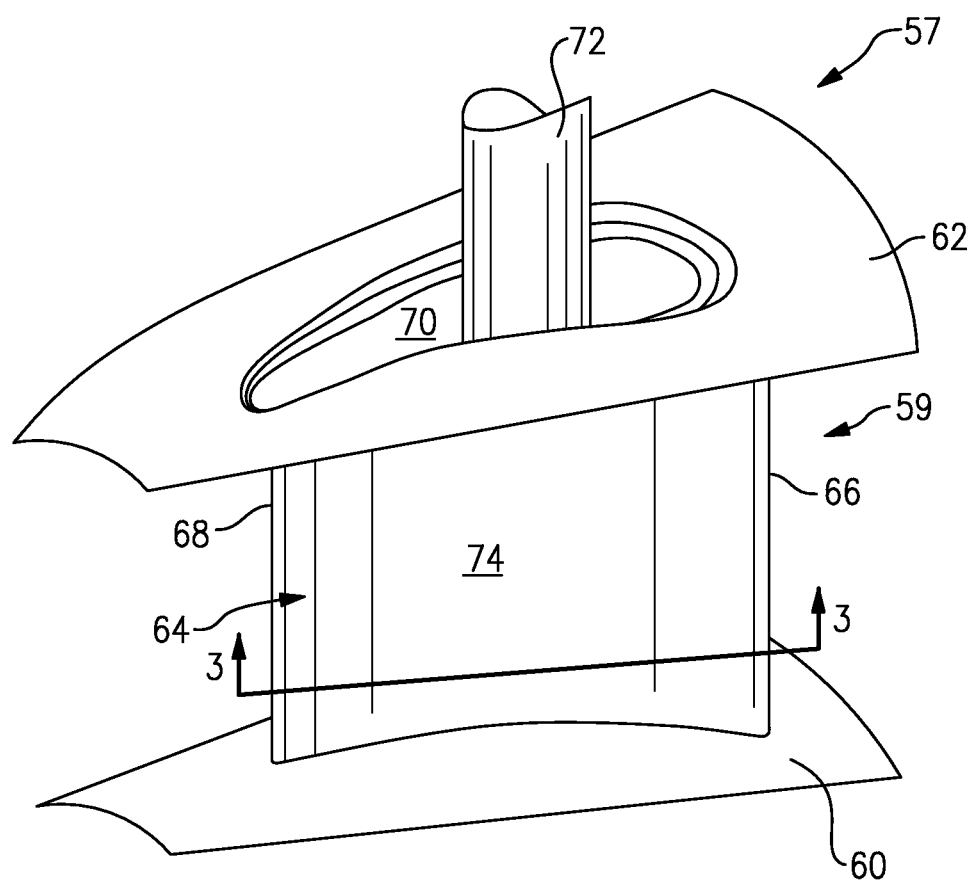
FIG. 2 schematically illustrates a mid turbine frame.

FIG. 2 illustrates the mid turbine frame 57 in more detail. The mid turbine frame 57 includes inner and outer platforms 60, 62 spaced apart from one another and joined to one another by an airfoil 64 that provides the vane 59. The vanes 59 may be discrete from one another or provided in clusters.

The airfoil 64 includes leading and trailing edges 66, 68 axially spaced apart from one another and joined by pressure and suction sides 74, 76.

The mid turbine frame 57 typically includes a cavity 70 that passes through the airfoil 64 from the outer platform 62 to the inner platform 60. One or more components 72, such as wiring, oil lines and/or bleed air lines, for example, are provided within the cavity 70. It is desirable to provide as large of a cavity 70 as possible to accommodate these components.

In one example, the airfoil 64 is constructed from a ceramic matrix composite (CMC) material. The CMC material typically includes layers provided by multiple plies wrapped about a mandrel during the forming process. The adjoining plies and layers, which are constructed from a silicon carbide material, for example, are adhered to one another using a resin.

Figure 3:
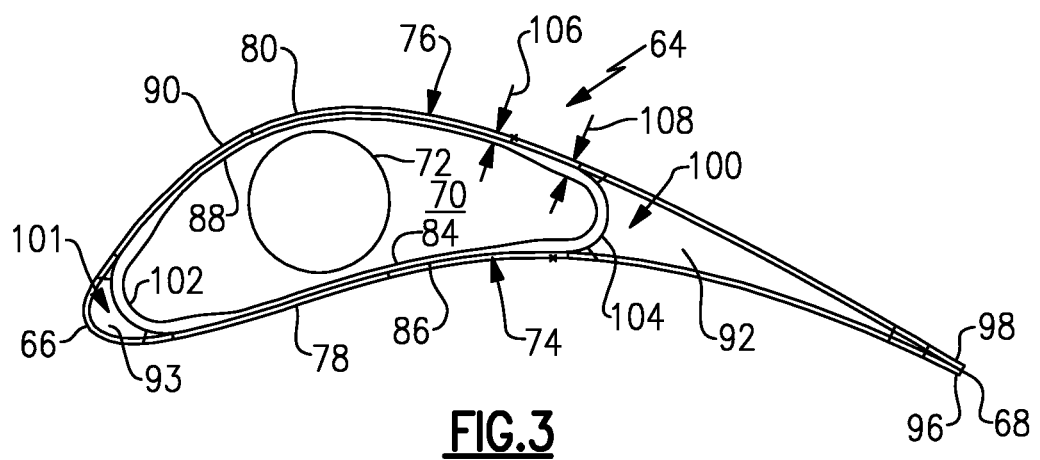
FIG. 3 is a cross-sectional view through the mid turbine airfoil shown in FIG. 2 taken along line 3-3.
Figure 4:
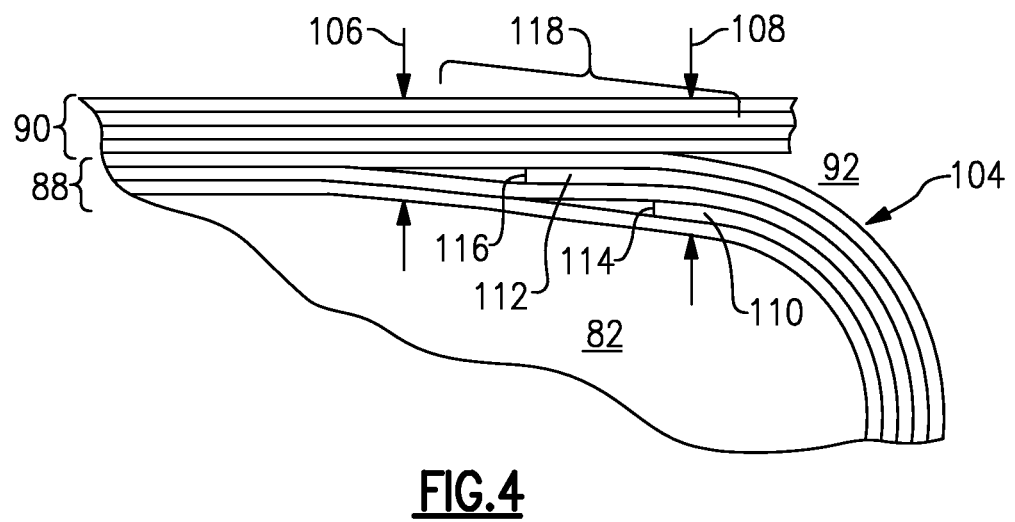
FIG. 4 is an enlarged view of a portion of the airfoil shown in FIG. 3.

Referring to FIG. 3, pressure and suction side wall 78, 80 are formed about a mandrel 82 (shown in FIG. 4). In one example, the pressure side wall 78 is provided by first and second pressure side layers 84, 86; the suction side wall 80 is provided by first and second suction side layers 88, 90. The second pressure and suction side layers 86, 90 are provided by a generally continuous layer from the trailing edge on the pressure side, wrapping around the leading edge, to the trailing edge on the suction side. The second layers 86, 90 terminate in ends 96, 98 are bonded to one another at the trailing edge 68 and arranged in a V-shape. The first pressure and suction side layers 84, 88 together provide a generally continuous flattened ring-shaped cavity. The example airfoil 64 provides a single cavity that is not bifurcated, which better accommodates the components 72.

A trailing edge filler 92 is provided in a space 100 between the first pressure and suction side layers 84, 88 and the second pressure and suction side layers 86, 90 near the trailing edge 68. A leading edge filler 93 is provided in a space 101 between the second layers 86, 90 and the first layer 84, 88. The fillers 92, 93 may be constructed from any suitable material, such as stacked fibers, unidirectional material, laid up fabric, chopped fibers, a monolithic structure, resin or any other suitable material in configuration that it conforms to a space 100 and 101 between the layers 84-90.

The first layer 84, 88 provides leading and trailing edge ply drops 102, 104. The first layer 84, 88 has a relatively thin cross-section and thickens in the area of the trailing and leading edge fillers 92, 93 to provide reinforcement in those areas to withstand differential pressures and resist splitting in these regions. Although two ply drops are shown, fewer or more ply drops may be provided. Additionally, a ply drop may be arranged in different locations and in a variety of configurations.

In the example illustrated, the pressure and suction side walls 78, 80 increase in thickness as they approach the leading and trailing edges 66, 68. In one example, the wall thickness provides a first thickness 106 that is less than a second thickness 108 at the ply drop near the adjoining filler.

Referring to FIG. 4, a transitioning thickness 118 is shown between the first and second thicknesses 106, 108. The transitioning thickness 118 is provided using multiple plies having varying lengths. The lengths of these transitional plies decrease as each transitional ply nears the cavity 70 in the example, although this pattern may be reversed, if desired to achieve the same effect. In the example, first and second plies 110, 112 respectively including terminal ends 114, 116. The ends 114, 116 are staggered and adjoining plies arranged over the ends 114, 116 to transition from the first thickness 106 to the second thickness 108. Although two transitional plies are shown, a fewer or greater number of transitional plies may be used.

A resin transfer molding (RTM) process may be used to manufacture the airfoil. The inner layers are wrapped about the mandrel. Transitional plies (e.g., first and second plies 110, 112) are layered in to form the thicker regions 102, 104 at opposite ends of the cavity 70 in the example. One side of the outer layers is placed into half the mold (pressure side or suction side.) The Mandrel is placed on top of the outer layer in the mold half. The added side outer plies are wrapped over the fillers and mandrel and the second half of mold is added.

The thicker regions 102, 104 provide reinforcement in areas of greater stress. The remaining portion of the first layer 84, 88 is thinner than these highly stressed areas to provide increased clearance for the components 72. Although a ply drop is shown near each of the leading and trailing edges, a ply drop may be used at any location if desired. Additionally, either or both of the fillers may be eliminated, if desired.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine, the airfoil includes leading and trailing edges, the airfoil comprising:
   a first layer forming a cavity having transitioning from a first thickness to a second thickness through a ply drop region;
   a second layer secured to the first layer; and
   pressure and suction side walls provided by the first and second layers, wherein each layer includes multiple plies, and the ply drop region includes leading and trailing edge ply drops, and the pressure and suction side walls increase in thickness in the leading edge ply drop as they approach the leading edge, and the pressure and suction side walls increase in thickness in the trailing edge ply drop as they approach the trailing edge.

2. The airfoil according to claim 1, comprising a space arranged between the first and second layers, and a filler is provided in the space.

3. The airfoil according to claim 2, wherein the second layer terminates in ends forming a V-shape at a trailing edge of the airfoil, and the filler is provided between the first layer and second layer.

4. The airfoil according to claim 3, wherein the second thickness is provided at a location between the first thickness and the filler.

5. The airfoil according to claim 2, wherein the filler is provided near a leading edge of the airfoil.

6. The airfoil according to claim 1, wherein the plies are constructed from a ceramic matrix composite bonded to one another by a resin.

7. The airfoil according to claim 6, wherein the ceramic matrix composite is a silicon carbide material.

8. The airfoil according to claim 1, wherein the airfoil is a vane.

9. The airfoil according to claim 8, wherein the vane is a mid turbine frame vane.

10. The airfoil according to claim 8, comprising a component passing through the cavity of the vane, the component adjacent to the first thickness.

11. The airfoil according to claim 8, wherein a single cavity is provided in the airfoil.

12. A method of forming an airfoil that includes leading and trailing edges, the method comprising:
    wrapping a first layer about a mandrel and building a thickened area with the first layer relative to an adjacent area of the first layer;
    applying a filler over the thickened area; and
    wrapping second layer around the first layer and the filler, pressure and suction side walls provided by the first and second layers, wherein each layer includes multiple plies, and the ply drop region includes leading and trailing edge ply drops, and the pressure and suction side walls increase in thickness in the leading edge ply drop as they approach the leading edge, and the pressure and suction side walls increase in thickness in the trailing edge ply drop as they approach the trailing edge.

13. The method according to claim 12, comprising the step of placing the layers and the filler as an assembly in a mold.

14. The method according to claim 13, comprising the step of removing the mandrel from the assembly to provide a cavity.

15. The method according to claim 12, wherein the second layer is arranged in V-shape to provide the trailing edge.

16. The method according to claim 12, wherein the plies are constructed from a ceramic matrix composite bonded to one another by a resin.

17. The method according to claim 16, wherein the ceramic matrix composite is a silicon carbide material.

\* \* \* \* \*